United States Patent
Charpentier

(10) Patent No.: US 7,866,458 B2
(45) Date of Patent: Jan. 11, 2011

(54) CONVEYOR DEVICE FOR CONTAINERS SUCH AS PREFORMS

(75) Inventor: Alain Charpentier, Octeville sur Mer (FR)

(73) Assignee: Sidel Participations, Octeville sur Mer (FR)

( * ) Notice: Subject to any disclaimer, the term of this patent is extended or adjusted under 35 U.S.C. 154(b) by 73 days.

(21) Appl. No.: 11/885,469

(22) PCT Filed: Feb. 28, 2006

(86) PCT No.: PCT/FR2006/000454

§ 371 (c)(1),
(2), (4) Date: Aug. 31, 2007

(87) PCT Pub. No.: WO2006/092499

PCT Pub. Date: Sep. 8, 2006

(65) Prior Publication Data

US 2008/0142339 A1 Jun. 19, 2008

(30) Foreign Application Priority Data

Mar. 2, 2005 (FR) .................................. 05 02119

(51) Int. Cl.
*B65G 37/00* (2006.01)
*B65G 17/00* (2006.01)
*B65G 17/26* (2006.01)

(52) U.S. Cl. .................... 198/626.1; 198/817; 198/620; 198/418.1; 198/450

(58) Field of Classification Search ............... 198/626.1, 198/817, 604, 626.6
See application file for complete search history.

(56) References Cited

U.S. PATENT DOCUMENTS

| 3,915,291 | A | * | 10/1975 | Vogts ........................ 198/626.1 |
| 4,802,571 | A | | 2/1989 | Born et al. |
| 5,388,707 | A | * | 2/1995 | Stivison et al. ............... 209/602 |
| 5,950,804 | A | * | 9/1999 | Farkas ....................... 198/626.1 |
| 5,950,807 | A | * | 9/1999 | Greer .......................... 198/850 |
| 6,109,426 | A | * | 8/2000 | Messer, III ................... 198/817 |
| 6,227,349 | B1 | * | 5/2001 | Finkowski et al. ........ 198/461.1 |
| 6,382,399 | B2 | * | 5/2002 | Simkowski ............... 198/626.1 |
| 2003/0164280 | A1 | * | 9/2003 | Delaporte et al. ......... 198/836.3 |

FOREIGN PATENT DOCUMENTS

| EP | 0 452 857 A | 10/1991 |
| EP | 0 875 470 A | 11/1998 |
| JP | 2001 063807 A | 3/2001 |

* cited by examiner

*Primary Examiner*—Gene Crawford
*Assistant Examiner*—Kavel P Singh
(74) *Attorney, Agent, or Firm*—Sughrue Mion, PLLC

(57) ABSTRACT

A linear, horizontal conveyor device for containers which are equipped with a collar at the base of the neck thereof. The invention includes two conveyors including endless links, which are each equipped with two parallel, mobile lines which face one another and which are driven in the same direction and at the same speed. The aforementioned lines are separated from one another by a distance that is greater than the diameter of the body of the containers and less than the diameter of the collars thereof. At least one conveyor includes a short segment that can be moved transversely outwards, such that the space between the two facing lines becomes greater than the diameter of the collar and the container falls.

10 Claims, 2 Drawing Sheets

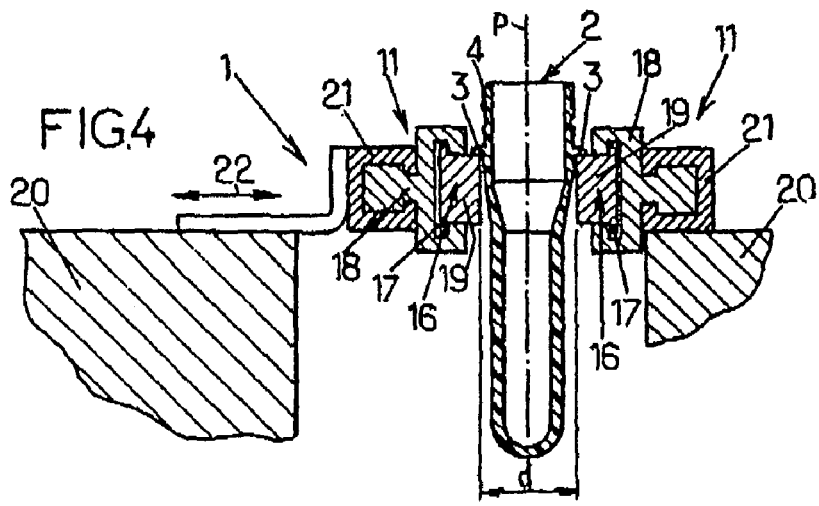
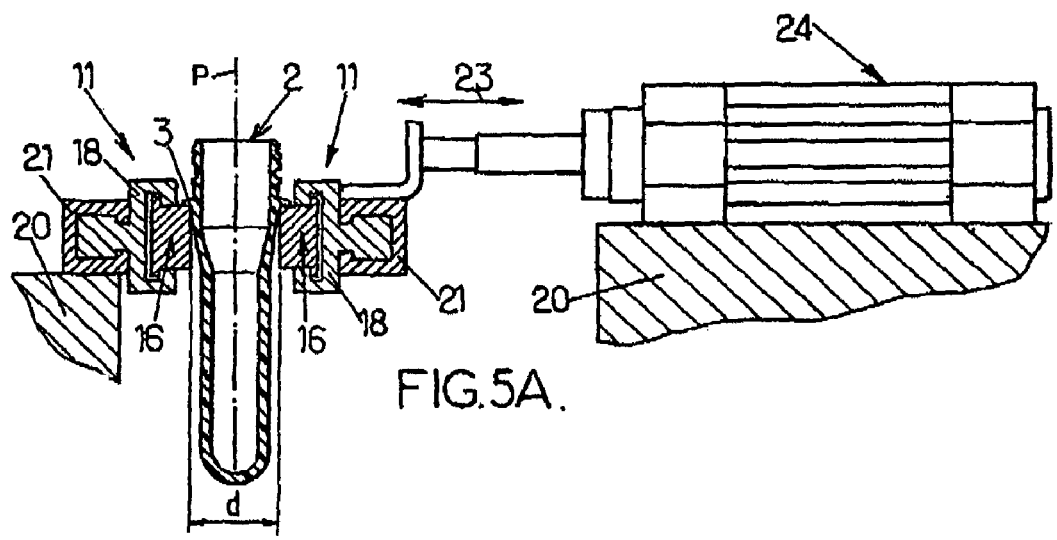
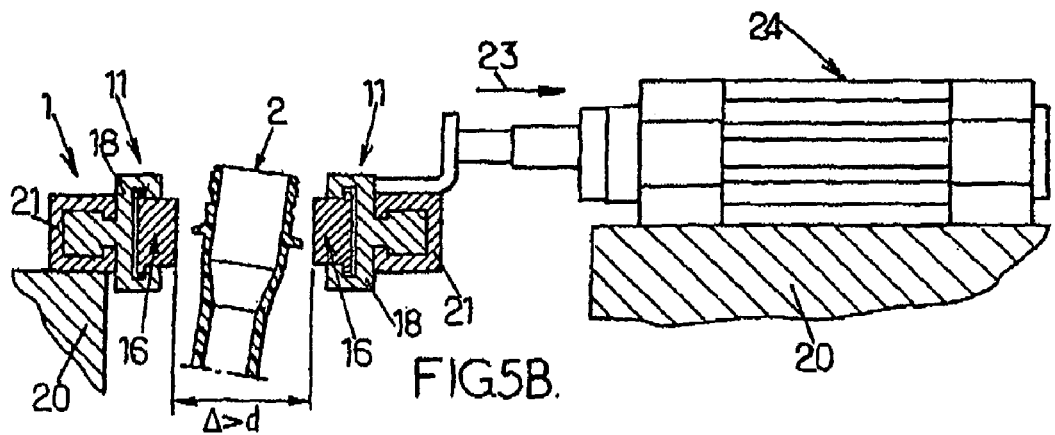

CONVEYOR DEVICE FOR CONTAINERS SUCH AS PREFORMS

FIELD OF THE INVENTION

The present invention relates generally to the conveying or transfer of containers and, more specifically, it relates to improvements applied to conveyor devices able to move, substantially rectilinearly and substantially horizontally, containers, in particular those made of thermoplastic material, comprising a collar at the base of their neck.

BACKGROUND OF THE INVENTION

In particular, in installations for the manufacture of containers such as bottles and for the packaging of products in such containers, the containers are moved by transfer or conveyor devices which are of many types (endless belt conveyors, notched wheels or wheels with arms, endless conveyors with turntables, pulsed air slides, inclined slides with movement by gravity, etc.).

In particular, at the entrance of an installation suitable for the manufacture of containers from preforms, the preforms must be fed one after the other without discontinuity and must be pushed in order to enter a loading device (for example into the peripheral notches of a loading wheel).

Currently, the correct characteristics for feeding preforms at the entrance of the installation are obtained by using a slide chute feed device: the preforms, taken to the top of the chute, slide, under the effect of gravity, on the slide on the two ramps on which they are supported, by their collar, in a substantially vertical position; taking account of the speed of grasping the preforms at the bottom of the chute which is substantially less than the speed of progress of the preforms on the chute, the preforms stack up after each other along the slide and the weight component of these stacked preforms on the slide forces the leading preform to enter the loading device.

The feed device assembly (not only the chute, but also the hopper for receiving preforms in bulk situated upstream of the chute, the preforms lift and certain appended devices) constitutes a voluminous unit and, in installations of very large capacity capable of producing several thousand, or even several tens of thousands of containers per hour, this unit has very large dimensions and, in particular, can have a height of several meters. This makes it indispensable to add appropriate safety equipment to the hopper (footbridge with guard rail, ladder with guard rail) for the supervision and maintenance personnel. This result of this is that the feed device assembly, generally metallic, is of very high cost and has large dimensions, at ground level and, in particular, vertically.

It can also be added that the preforms, in a substantially vertical position, are supported on the two ramps of the inclined slide only by two points of their collar and this mediocre support causes the preforms to progress on the slide in an irregular and rocking manner, which proves to be disadvantageous (risk of jamming in the slide or of ejection of preforms out of the slide).

From the document EP 0 452 857, there is also known a conveyor device of the aforesaid type which comprises two conveyors respectively equipped with two endless links which respectively have two moving facing lines which are substantially parallel and substantially horizontal and which are driven in the same direction and substantially at the same speed, these two lines being separated from each other by a distance greater than the diameter of the body of the containers and less than the diameter of the collar of the containers such that the containers are supported in a substantially vertical position on the two lines by their collar.

Even though this known device meets the expectations of users with regard to low manufacturing cost and low overall size, in particular vertical size, it does not however solve certain problems which arise in the phase of feeding preforms, in particular with regard to the elimination of undesirable preforms (defective preforms, preforms nested in each other, etc.).

SUMMARY OF THE INVENTION

The purpose of the invention is precisely to satisfy these expectations.

For this purpose, the invention proposes a conveyor device for moving, substantially rectilinearly and substantially horizontally, containers, in particular made of thermoplastic material, comprising a collar at the base of their neck, which device comprises two conveyors respectively equipped with two endless links which respectively have two moving facing lines which are substantially parallel and substantially horizontal and which are driven in the same direction and substantially at the same speed, these two lines being separated from each other by a distance greater than the diameter of the body of the containers and less than the diameter of the collar of the containers such that the containers are supported in a substantially vertical position on the two lines by their collar, which device, being arranged according to the invention, is characterized in that at least one of the conveyors comprises at least one short segment which is movable transversely towards the outside such that, over a length of the line of said conveyor which corresponds approximately to the diameter of the collar of a container, the separation between the two facing lines becomes greater than the nominal separation and than the diameter of the collar, due to which the corresponding container is no longer supported and falls. Such an arrangement allows, due to the use of simple means that can be actuated temporarily, the elimination of undesirable containers, such as for example nested preforms or preforms having a defect.

Advantageously, the two conveyors are of the "flat" type and run in substantially the same substantially horizontal plane around return wheels with substantially vertical axes, such that in this way a central free passage for the preforms is simply defined.

Also advantageously, provision is made for the speed of movement of the two lines, and therefore of the containers, is greater than the speed of grasping containers at the exit of the device, due to which containers are pressed against each other in the vicinity of the exit and are pushed to the exit of the device. Thus, due to the choice of an appropriate speed of the moving endless conveyor lines with respect to the speed of grasping containers at the exit, the device is able to achieve the accumulation of the preforms necessary for forcing the preforms into the loading device.

Still in a simple way, the two conveyors can be driven at substantially the same speed by unique driving means.

In one possible embodiment which is very simple to implement and which can prove to be very advantageous at least for certain applications, the two endless lines are wires.

In another possible embodiment which is preferred, in particular for the large capacity installations produced by the Applicant, the two endless lines are endless belts, and in particular are endless bands substantially rigid in the transverse direction and disposed vertically.

Such an arrangement of endless belts substantially rigid in the transverse direction and disposed vertically proves to be particular advantageous for the variant embodiments they allow. Thus, it becomes possible to provide for at least one conveyor to be mounted on a transversely movable frame in such a way that the separation distance between the two substantially parallel lines can be adjusted according to the diameter of the body of the containers and to the diameter of the collar of the containers. It is then desirable that the two conveyors should be mounted on respective frames that are transversely movable in a symmetrical manner in such a way that the trajectory of movement of the axis of the containers remains aligned with the devices situates upstream and/or downstream. These arrangements allow a same conveyor device to be adapted, in a simple manner, to the processing of containers having different dimensional characteristics.

As clearly apparent from the above explanations, the conveyor device according to the invention can be applied for the conveying of many types of containers equipped with a collar at the base of the neck. A preferred application, even though not exclusive, relates to the feeding of preforms at the entrance of an installation for manufacturing containers, the preforms being delivered in a vertical position with the neck uppermost, the preforms being moved by positive driving on a path which can be substantially horizontal. Said disadvantages of gravity-driven devices can thus be avoided: the device according to the invention does not necessitate especially high premises for its installation and it can be disposed at the height of a man such that all of the safety accessories necessary for personnel working at height can be eliminated.

BRIEF DESCRIPTION OF THE DRAWINGS

The invention will be better understood on reading the following detailed description of certain preferred embodiments given solely as examples that are in no way limitative. In this description, reference is made to the appended drawings in which:

FIG. 4 is a cross-sectional view of a preferred embodiment of apart of a conveyor device according to the invention; and FIGS. 5A and 5B are cross-sectional views of a conveyor device arranged according to the invention, shown in two different operating positions.

DETAILED DESCRIPTION OF THE INVENTION

Figure 1:
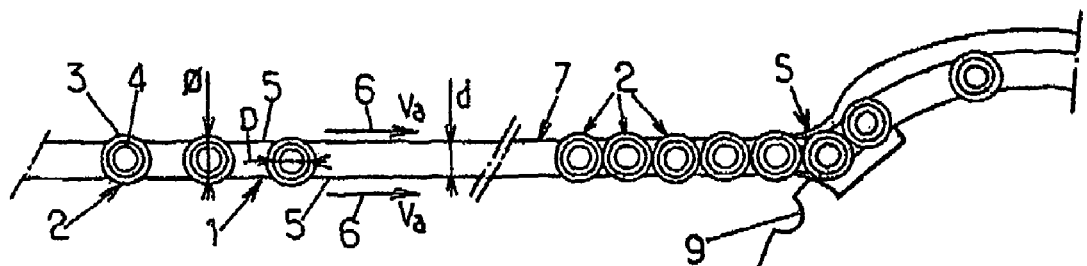
FIG. 1 is a very diagrammatic figure, shown in plan view, of a part of a basic arrangement of a conveyor device according to the invention shown in the context of the feeding of preforms in an installation for manufacturing containers.

Referring firstly to FIG. 1, this figure shows, in a very diagrammatic manner, a conveyor device, designated in its entirety by the reference 1, able to move, substantially rectilinearly and substantially horizontally, containers 2 such as performs, in particular made of thermoplastic material such as PET, provided with a collar 3, at the base of their neck 4. The conveyor device 1 comprises two lines 5, moving as shown by the arrows 6, of at least one endless link denoted in its entirety by the reference 7. These two lines 5 are substantially parallel and substantially horizontal and are derived in the same direction (arrows 6) and substantially at the same speed Va. Moreover, these two lines 5 are separated from each other by a distance d greater than the diameter D of the body and/or of the neck 4 of the containers 2 and less than the diameter Φ of the collar 3 of the containers 2 such that the containers 2 are supported in a substantially vertical position on the two lines 5 by their collar 3. Finally, the speed of movement Va of the two lines 5, and therefore of the containers 2 inserted in the conveyor device 1, is greater than the speed Vs of grasping the containers 2 at the exit S of the conveyor device. Thus, containers 2 are pressed against each other at least on the vicinity of the exit S as shown in FIG. 1, such that the leading container 2 is subjected to a thrust tending to make it leave the conveyor device in order to be grasped, for example by an endless loading screw (not shown) and/or by a loading wheel 8 (direction of rotation indicated by the arrow 10) provided with notches 9.

Figure 2:
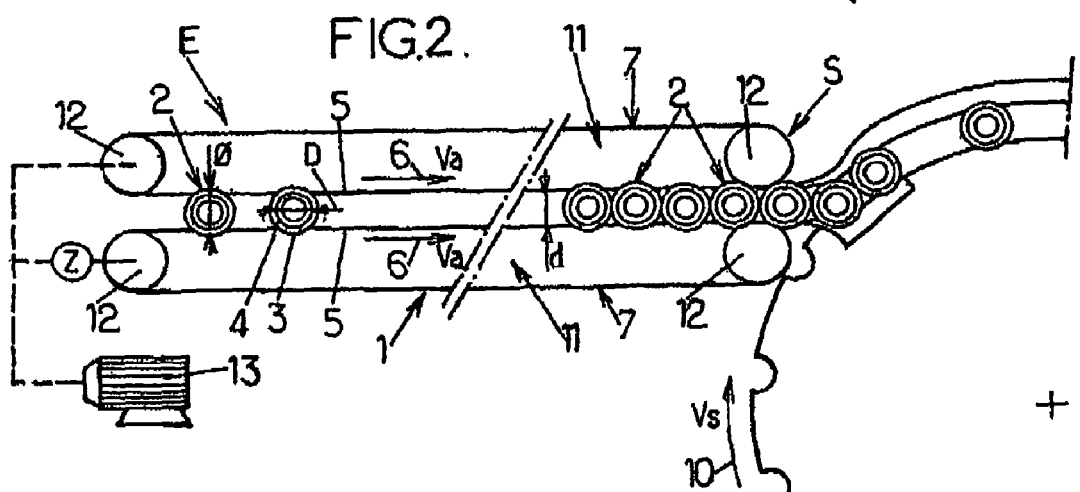
FIG. 2 is a very diagrammatic figure, shown in plan view, of a preferred embodiment of a conveyor device according to the basic arrangement shown in FIG. 1.

The conveyor device 1 can be constituted in any appropriate manner able to obtain two lines 5 having the above features and, in particular, being parallel and at the same speed. However, it proves that the embodiment of the conveyor device with a single endless link 7 wound in an appropriate manner around return wheels is certainly possible, but complex and not very practical to implement. Also, in concrete terms, it will be preferred, as shown in FIG. 2, to have the conveyor device comprise two conveyors 11 respectively equipped with two endless links 7 which respectively include said two lines 5. In a preferred embodiment shown in FIG. 2, the two conveyors 11 are of the "flat" type and the two endless links 7 run in essentially a same horizontal plane about return wheels 12 having substantially vertical axes located at the entrance E and at the exit S of the conveyor device 1.

In order to simplify the structure of the conveyor device 1 and to reduce its cost, it can be envisaged that the two endless links 7 of the two respective conveyors 11 are driving at substantially the same speed by unique driving means 13, one of the conveyors 11 being driven in the reverse direction with respect to that of the other one by means of a reverser 14 of the direction of rotation as shown in FIG. 2.

With regard now to the endless links 7 that can be used in the context of the present invention, they can be of any appropriate type known to those skilled in the art.

Figures 3A, 3B:
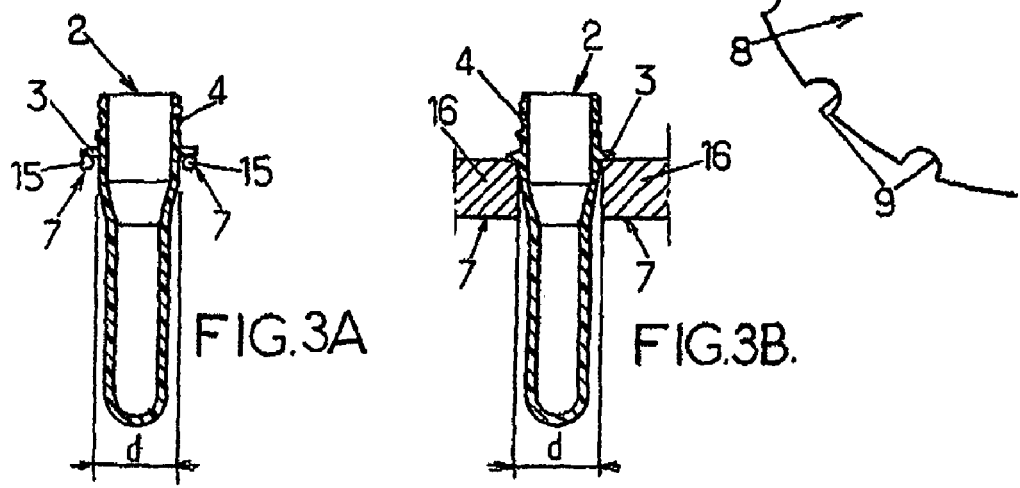
FIG. 3A is a cross-sectional view of an advantageous embodiment of a conveyor device according to the invention.
FIG. 3B is a cross-sectional view of another preferred embodiment of a conveyor device according to the invention.

A first solution noteworthy for its simplicity consists, as shown in the cross-sectional view in FIG. 3A, in producing the endless links 7 in the form of respective wires 15 made of any material sufficiently strong to withstand the driving force imparted by the driving means 13. In particular, the two wires 15 can be made of metal, in particular of stainless steel, and can have a relatively small diameter whilst having the necessary mechanical strength.

In a preferred embodiment, a second solution consists, as shown in the cross-sectional view in FIG. 3B, in producing the two endless links 7 in the form of respective belts 16, which are preferably disposed vertically in such a way at to exhibit the required flexibility for their winding around the return wheels 12 having vertical axes. The two belts 16 can be arranged in any desirable manner according to the application and/or to the structure of the conveyor device and can be either in the form of continuous belts, or in the form of belts formed of successive segments arranged end-to-end and articulated with one another. The belts 16 can be made of any appropriate material, for example aluminum, stainless steel or, advantageously, from a synthetic material such as a polyamide.

In FIG. 4 there is shown, in cross-section, a concrete example of embodiment of the useful part of the two conveyors 11 (the return lines of the conveyors are not shown) arranged in an appropriate manner for meeting the requirements of the invention. In cross-section, each belt 16 approximately has the shape of a "T" with its stem horizontal and its head 17 is engaged in a freely sliding manner in a profile 18 in the shape of an open channel whilst the stem 19 of the T protrudes out of the profile and supports, on its upper edge, the collar 3 of the container 2. The profile 18 is itself fixed in any desirable manner on a frame 20; for example, as shown in FIG. 4, the profile 18 is made from a synthetic material chosen such that the coefficient of sliding with the constituent material of the belt 16 is as low as possible, and is housed in a metal profile 21 (for example made of aluminum or stainless steel) which is fixed to the frame 20.

The conveyors 11 arranged as just described are very flexible in use because, by using belts 16 formed of assembled elements, it is possible to vary the length of these conveyors very simply according to the specific configurations of each installation.

Furthermore, this arrangement allows the use of certain very practical special arrangements. In particular, one special arrangement, which is shown in FIG. 4, consists in that at least one conveyor 11 (the left hand one in FIG. 4) is mounted on a frame 20 which is movable in the transverse direction (arrow 22) such that the separation distance d between the two substantially parallel belts 16 can be adjusted according to the diameter D of the body and/or of the neck 4 and to the diameter Φ of the collar 3 of the containers 2. Advantageously therefore, it is possible to provide for the two conveyors 11 to be mounted on respective frames 20 which are transversely movable in a symmetrical manner with respect to the median plane P of the two belts 16 such that the axis of movement of the performs remains unchanged and remains coaxial with the entrance and exit devices. The arrangement which has just been described makes it possible to extend the field of use of the conveyor device 1 since it thus becomes able to accept performs of different diameters.

The arrangement according to the invention, which is illustrated in two different operational positions in FIGS. 5A and 5B respectively, consists in that at least one of the two conveyors 11 comprises at least one short segment that is temporarily transversely movable towards the outside (arrow 23) such that, over a length of said line which approximately corresponds to the diameter Φ of the collar 3 of a container 2, the separation Δ between the two facing belts 16 becomes greater than its nominal value d and than the diameter Φ of the collar 3. When the two belts 16 are thus separated, the collar is no longer supported in a stable manner and the corresponding container 2 falls (FIG. 5B). Over the segment in question, the arrangement of the profiles 18, 21 is no longer integral with the frame 20, but is suspended from a driving device 24 which is itself carried by the frame 20. The movement of the segment of the conveyor 11 in question is controlled by the driving device 24 (for example electric or pneumatic), placed under the control of an appropriate control unit. The arrangement which has just been described, which is structurally simple to produce and to use, makes it possible to eliminate undesirable preforms (defective preforms, nested preforms, etc). It is emphasized that the movement (arrow 23) imparted by the driving device 24 to a segment of a conveyor is independent of the movement (arrow 22) of adjustment of the separation of the two conveyors of the conveyor device according to the diameter of the preforms to be moved; on the contrary, the movable part of the driving device 24 must accompany the conveyor in question in its movement of adjustment to the diameter of the preforms to be conveyed.

The invention claimed is:

1. A conveyor device for moving, substantially rectilinearly and substantially horizontally, containers, each container comprising a neck and a collar at the base of said neck, which device comprises two conveyors respectively equipped with two endless links which respectively have two moving facing lines which are substantially parallel and substantially horizontal and which are driven in the same direction and substantially at the same speed, these two lines being separated from each other by a nominal separation defined by a distance greater than the diameter of the neck of the containers and less than the diameter of the collar of the containers such that the containers are supported in a substantially vertical position on the two lines by their collar, wherein at least one of said two conveyors comprises at least one short conveyor segment that comprises an engaging portion adapted to engage the line of said conveyor, said conveyor segment being movable transversely towards the outside such that, over a length of the line of said conveyor which corresponds approximately to the diameter of the collar of a container, the separation between the two facing lines becomes greater than the nominal separation and than the diameter of the collar, whereby the corresponding container is no longer supported and falls;

wherein the speed of movement of the two lines, and therefore of the containers, is greater than the speed of grasping containers at the exit of the device, whereby containers are pressed against each other in the vicinity of the exit and are pushed to the exit of the device.

2. The device as claimed in claim 1, wherein the two conveyors are of the "flat" type and wherein the two endless links run in the same substantially horizontal plane around return wheels with substantially vertical axes.

3. The device as claimed in claim 1, wherein the two conveyors are driven at substantially the same speed by unique driving means.

4. The device as claimed in claim 1, wherein the two endless lines are wires.

5. The device as claimed in claim 1, wherein the two endless lines are belts.

6. The device as claimed in claim 5, wherein the two endless lines are vertically disposed belts.

7. The device as claimed in claim 1, wherein at least one conveyor is mounted on a transversely movable frame in such a way that the separation distance between the two substantially parallel lines can be adjusted according to the diameter of the body and/or of the neck of the containers and to the diameter of the collar of the containers.

8. The device as claimed in claim 7, wherein the two conveyors are mounted on respective frames which are transversely movable in a symmetrical manner with respect to the median plane.

9. The conveyor device according to claim 1, wherein the containers are preforms for forming bottles.

10. The conveyor device according to claim 1, wherein the containers are bottles.

* * * * *